(12) United States Patent (10) Patent No.: US 6,458,936 B2
Gisler (45) Date of Patent: Oct. 1, 2002

(54) FIBER-REACTIVE DISAZO COMPOUNDS

(75) Inventor: Markus Gisler, Rheinfelden (CH)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/808,480

(22) Filed: Mar. 14, 2001

(30) Foreign Application Priority Data

Mar. 14, 2000 (GB) .............................................. 0006029

(51) Int. Cl.$^7$ ......................... C09B 43/00; C09B 62/513

(52) U.S. Cl. ......................... 534/588; 534/637; 534/582

(58) Field of Search .............................. 534/637, 588; 8/549

(56) References Cited

U.S. PATENT DOCUMENTS

| | | | |
|---|---|---|---|
| 4,649,193 A | 3/1987 | Meininger et al. | 534/622 |
| 5,243,034 A | 9/1993 | Tappe et al. | 534/637 |

FOREIGN PATENT DOCUMENTS

| | | | |
|---|---|---|---|
| EP | 0 374 758 | | 6/1990 |
| JP | 59-174652 | | 10/1984 |
| JP | 60-099170 | * | 6/1985 |
| JP | 09-328627 | * | 12/1997 |

OTHER PUBLICATIONS

International Search Report for PCT/IB 01/00355, mail dateOct. 17, 2001.
English abstract for JP 59–174652, Oct. 3, 1984.
* cited by examiner

*Primary Examiner*—Fiona T. Powers
(74) *Attorney, Agent, or Firm*—Andrew F. Sayko, Jr.; Scott E. Hanf

(57) ABSTRACT

The invention is related to compounds according to the formula (I)

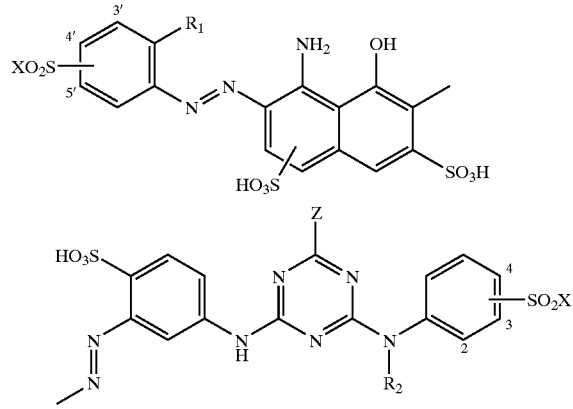

and salts thereof, or mixtures of such compounds or of their salts, wherein the substituents have the meanings as defined in claim 1;
these compounds are useful as fiber-reactive dyestuffs in dyeing and printing hydroxy-group-containing and nitrogen-containing organic substrates.

5 Claims, No Drawings

FIBER-REACTIVE DISAZO COMPOUNDS

FIELD OF THE INVENTION

This invention relates to fiber-reactive disazo compounds of formula (I) and a process for their production and the use of these compounds in dyeing or printing processes. These compounds are suitable for use as fiber-reactive dyestuffs in any conventional dyeing or printing processes.

DESCRIPTION OF THE PREFERRED EMBODIMENTS

The invention provides compounds of formula (I)

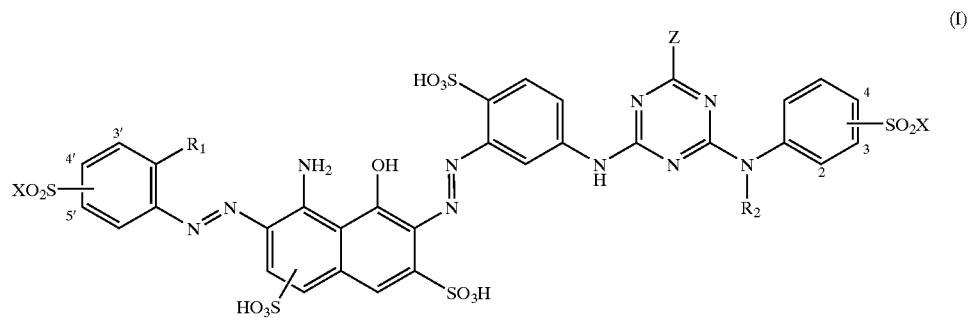

and salts thereof, or mixtures of such compounds or of their salts, wherein

X is a group —CH=CH$_2$ or —CH$_2$CH$_2$Y, wherein Y is —OH or a group which can be split off under alkaline conditions, R$_1$ is H, —SO$_3$H, —COOH, —OCH$_3$, or —CH$_3$, R$_2$ is C$_{1-4}$alkyl or C$_{1-4}$hydroxyalkyl, Z is —Cl or —F.

In preferred compounds according to formula (I) Y is —OSO$_3$H, —Cl or —SSO$_3$H.

In further preferred compounds according to formula (I) R$_1$ is —H or —SO$_3$H.

In further preferred compounds according to formula (I) R$_2$ is —CH$_3$, —CH$_2$CH$_3$ or —CH$_2$CH$_2$OH.

In more preferred compounds according to formula (I) Y is —OSO$_3$H.

In more preferred compounds according to formula (I) R$_1$ is —H.

In more preferred compounds according to formula (I) R$_2$ is —CH$_3$ or —CH$_2$CH$_3$.

Especially preferred compounds of formula (I) correspond to formula (Ia)

wherein R$_2$ is —CH$_3$ or —CH$_2$CH$_3$ and Z is —Cl or —F and salts thereof and mixtures thereof.

When a compound of formula (I) is in salt form, the cation associated with sulpho, sulfato and any carboxy groups is not critical and may be any one of those non-chromophoric cations conventional in the field of fiber-reactive dyes provided that the corresponding salts are water-soluble. Examples of such cations are alkali metal cations and unsubstituted and substituted ammonium cations, e.g., lithium, sodium, potassium, ammonium, mono-, di- and tri-ethanolammonium.

The preferred cations are the alkali metal cations and ammonium, with sodium being the most preferred.

In a compound of formula (I) the cations of the sulpho groups can be the same or different, e.g., they can also be a mixture of the above mentioned cations meaning that the compound of formula (I) can be in a mixed salt form.

The invention further provides a process for the preparation of compounds of formula (I) or mixtures thereof which is characterized by coupling a compound of formula (II)

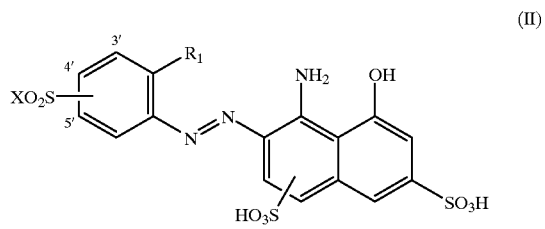

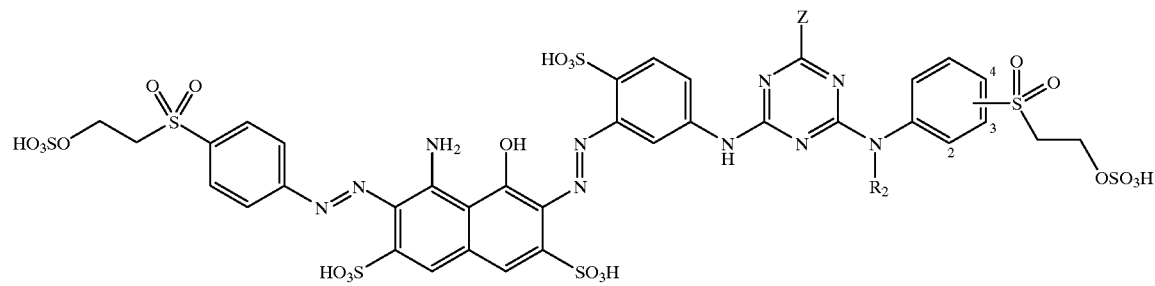

with a diazotized amine of formula (III)

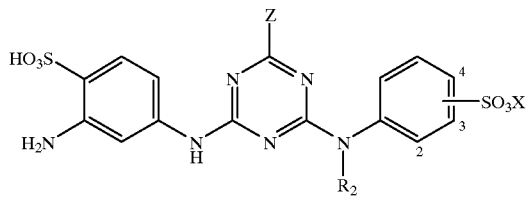

(III)

Compounds of formula (II) are obtained by diazotisation and coupling of appropriate amines with an 1-amino-8-hydroxynaphthalene-disulfonic acid.

Compounds of formula (III) are obtained by reaction of 2,4-diaminobenzenesulfonic acid with the condensation product of the appropriate amino starting material with 2,4,6-trifluoro- or 2,4,6-trichlorotriazine.

The condensation reaction of the amino compound with 2,4,6-trifluorotriazine is carried out in a manner known per se, preferably at −10° to 10° C., more preferably at −5° to 0° C., and at a pH of about 4–7. The condensation reaction of the amino compound with or 2,4,6-trichlorotriazine is carried out in a manner known per se, preferably at −0° to 50° C., more preferably at 10° to 20° C., and at a pH of about 4–7.

The diazotization and coupling reactions are effected in accordance with conventional methods; coupling is preferably carried out at 5° to 30° C., the first coupling to a compound of formula (II) in an acidic medium at a pH of 0 to 4, the second coupling to a compound of formula (I) in a weakly acidic to weakly basic reaction medium at a pH of 4 to 9.

The compounds of formula (I) may be isolated in accordance with known methods, for example, by conventional salting out with an alkali metal salt, filtering and drying optionally in vacuum and at slightly elevated temperatures.

Depending on the reaction and isolation conditions, a compound of formula (I) is obtained in free acid or preferably salt form or even mixed salt form containing, for example, one or more of the above mentioned cations. It may be converted from free acid to a salt form or mixture of salt forms or vice versa or from one salt form to another by conventional means.

The compounds of formula (I) and mixtures thereof are useful as fiber-reactive dyestuffs for dyeing or printing on hydroxy group- or nitrogen-containing organic substrates. Preferred substrates are leather and fiber material comprising natural or synthetic polyamides and, particularly, natural or regenerated Cellulose such as cotton, viscose, lyocell fibers and spun rayon. The most preferred substrate is textile material comprising cotton.

Dyeing or printing is effected in accordance with known methods conventional in the fiber-reactive dyestuff field. Preferably, for the compounds of formula (I) the exhaust dyeing method is used at temperatures within the range of 30° to 100° C., particularly at 40°–80° C., respectively, whereby a liquor to goods ratio of 6:1 to 30:1 is used and more preferably of 10:1 to 20:1.

The compounds of this invention have good compatibility with known fiber-reactive dyes; they may be applied alone or in combination with appropriate fiber-reactive dyestuffs of the same class having analogous dyeing properties such as common fastness properties and the extent of ability to exhaust from the dyebath onto fiber. The dyeings obtained with such combination mixtures have good fastness properties and are comparable to those obtained with a single dyestuff.

The compounds of formula (I) give good exhaust and fixation yields when used as dyestuffs. Moreover, any unfixed compound is easily washed off the substrate. The dyeings and prints derived from the compounds of formula (I) exhibit good light fastness and good wet fastness properties such as wash, water, seawater and sweat fastness. They also exhibit good resistance to oxidation agents such as chlorinated water, hydrochloride bleach, peroxide bleach and perborate-containing washing detergents.

The new dyestuffs can also be used in the preparation of printing inks, which are suitable for the ink jet process on hydroxy group- or nitrogen-containing organic substrates. Preferred substrates are paper, leather and fiber material comprising natural or synthetic polyamides and, particularly, natural or regenerated Cellulose such as cotton, viscose, lyocell fibers and spun rayon. The most preferred substrates are paper and textile material comprising cotton.

EXAMPLES

The following examples illustrate the invention. In the examples all parts and percentages are by weight unless indicated to the contrary, and all temperatures are given in degrees Centigrade.

Example 1

309 parts 4-(2'-sulfatoethylsulfonyl)aniline and 175 parts concentrated hydrochloric acid are put into 1500 parts water under stirring and the suspension is cooled to about 0° to 5° by addition of about 600 parts of ice. At this temperature about 190 parts of a 40% sodium nitrite solution are added dropwise and at the same time 319 parts 1-amino-8-hydroxynaphthalene-3,6-disulfonic acid are suspended in 1000 parts water. This suspension is combined with the first diazo suspension and the pH value is raised to 5 to 6 by addition of about 1270 parts of a 15% sodium carbonate solution. The monoazo dye corresponds to formula 1a

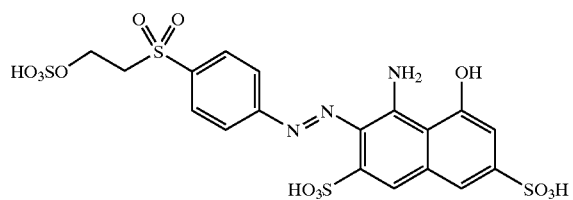

1a

In the meantime 340 parts of 3-ethylamino-benzene(2'-sulfatoethylsulfone) are dissolved in 1200 parts of water the pH is adjusted with 15% sodium carbonate solution at 5 and the resulting mixture is cooled down to 5–10° C. At this temperature a stirred suspension of 203 parts of 2,4,6-trichlorotriazine in 400 parts of ice/water is added during 20 minutes. The reaction mixture is stirred for some 20 minutes more. Then the pH is increased to 6.5–7 by addition of 15% sodium carbonate solution. Once the reaction is accomplished the temperature is increased to 30–35° C. and a solution made by dissolving 197 parts of 2,4-diaminobenzenesulfonic acid with 140 parts concentrated caustic soda solution in 900 parts of water is added dropwise to the reaction mixture. During the addition the temperature is maintained at 30–40° C. and the pH at 7.

The reaction mixture is cooled down to 0–5° C. and is diazotized by addition of 191 parts of 40% sodiumnitrite solution. After the diazotization is finished and diazo suspension is added to the solution of the monoazo dyestuff. The pH value is raised further to 6 to 8 by addition of about 75 parts of the 15% sodium carbonate solution and the obtained solution spray dried. About 2000 parts of a bluish black salt containing powder are obtained which dyes Cellulose fibers in deep navy shades. The dyestuff corresponds to the formula 1b are added at this temperature during 60 minutes, and the pH is maintained at 5–5.2 by addition of 15% sodium carbonate solution. Once the reaction is accomplished the cooling bath is removed and a solution made by dissolving 197 parts of 2,4-diaminobenzenesulfonic acid with 140 parts concentrated caustic soda solution in 900 parts of water is added dropwise to the reaction mixture. During the addition the temperature is maintained at 10–15° C. and the pH at 7.

The reaction mixture is cooled down to 0–5° C. and is diazotized by addition of 191 parts of 40% sodiumnitrite

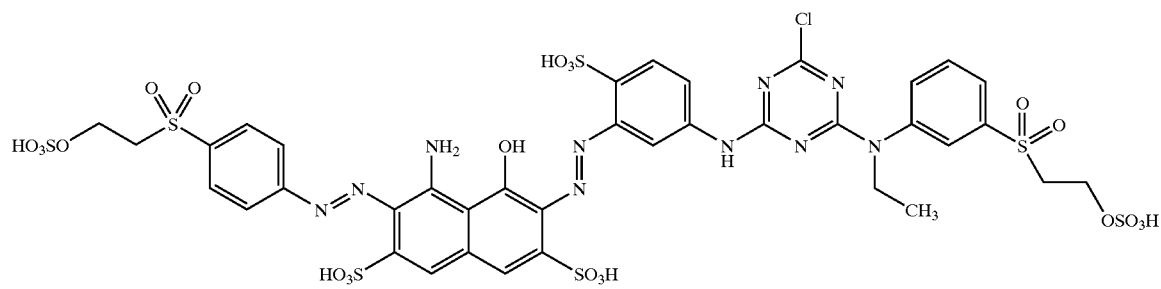

(Ib)

and the resultant dyeings have excellent fastnesses whereby the unfixed dyestuff can easily be washed out, even from deep dyeings.

Example 2

As mentioned in example 1 one makes a solution of the monoazodye of formula 1a. 340 parts of 3-ethylaminobenzene(2'-sulfatoethylsulfone) are dissolved in 1200 parts of water the pH is adjusted with 15% sodium carbonate solution at 5 and the resulting mixture is chilled to −10 to −5° C. at this temperature 154 parts of 2,4,6-trifluorotriazine solution. After the diazotization is finished and diazo suspension is added to the solution of the monoazo dyestuff of formula 1a. The pH value is raised further to 6 to 8 by addition of about 75 parts of the 15% sodium carbonate solution and the obtained solution spray dried. About 2000 parts of a bluish black salt containing powder are obtained which dyes Cellulose fibers in deep navy shades. The dyestuff corresponds to the formula (IV)

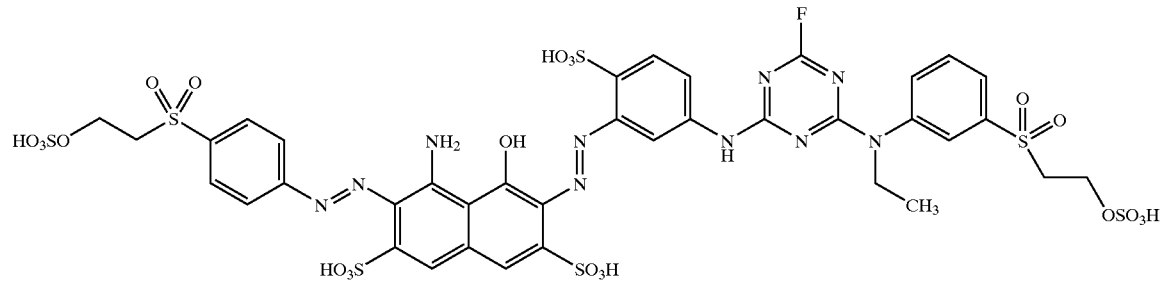

(IV)

The following examples 3–12 are made according the methods described in examples 1 and 2:

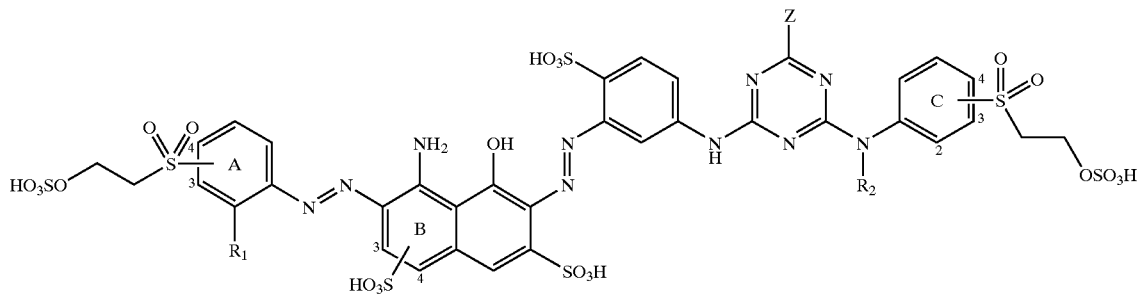

| Example | Ring A SO₂ (Pos.) | R₁ | Ring B SO₃H (Pos.) | Z | R₂ | Ring C SO₂ (Pos.) |
|---|---|---|---|---|---|---|
| 3 | 4 | SO₃H | 3 | Cl | CH₃ | 4 |
| 4 | 4 | H | 3 | Cl | CH₃ | 4 |
| 5 | 4 | H | 3 | Cl | C₂H₅ | 4 |
| 6 | 3 | H | 3 | Cl | C₂H₅ | 3 |
| 7 | 3 | H | 4 | Cl | C₂H₅ | 3 |
| 8 | 4 | SO₃H | 4 | Cl | CH₃ | 3 |
| 9 | 4 | H | 3 | F | CH₃ | 3 |
| 10 | 4 | OCH₃ | 3 | F | C₂H₅ | 3 |
| 11 | 4 | SO₃H | 3 | F | CH₃ | 4 |
| 12 | 4 | SO₃H | 4 | F | CH₃ | 4 |

Application Example A 0.3 Part of the dyestuff of Example 1 is dissolved in 100 parts of demineralized water and 3 g Glauber's salt (calcined) is added. The dyebath is heated to 50° C., then 10 parts of cotton fabric (bleached) are added. After 30 minutes at 50° C., 0.4 part of sodium carbonate (calcined) is added to the bath. During the addition of sodium carbonate the temperature is kept at 50° C. Subsequently, the dyebath is heated to 60° C., and dyeing is effected for a further one hour at 60° C.

The dyed fabric is then rinsed with running cold water for 3 minutes and afterwards with running hot water for a further 3 minutes. The dyeing is washed at the boil for 15 minutes in 500 parts of demineralized water in the presence of 0.25 part of Marseille soaps. After being rinsed with running hot water (for 3 minutes) and centrifuged, the dyeing is dried in a cabinet drier at about 70° C. A navy cotton dyeing is obtained showing good fastness properties, and particularly high wet fastness properties, which is stable towards oxidative influences.

Application Example B

To a dyebath containing in 100 parts of demineralized water and 3 g Glauber's salt (calcined) 10 parts of cotton fabric (bleached) are added. The bath is heated to 50° C. within 10 minutes, and 0.5 part of the dyestuff of Example 1 is added. After a further 30 minutes at 50° C., 1 part of sodium carbonate (calcined) is added. The dyebath is then heated to 60° C. and dyeing is continued at 60° C. for a further 45 minutes.

The dyed fabric is rinsed with running cold and then hot water and washed at the boil according to the method of application Example A. After rinsing and drying a navy cotton dyeing is obtained which had the same good fastness properties as indicated in Application Example A.

Similarly, the dyestuffs of Examples 2–12 or mixtures of the exemplified dyestuffs are employed to dye cotton in accordance with the method described in Application Example A or B. The cotton dyeings thus obtained are navy and show good fastness properties.

Application Example C

A printing paste consisting of

| | |
|---|---|
| 40 | parts of dyestuff of Example 1 |
| 100 | parts of urea |
| 350 | parts of water |
| 500 | parts of a 4% sodium alginate thickener and |
| 10 | parts of sodium bicarbonate |
| 1000 | parts in all | is applied to cotton fabric in accordance with conventional printing methods.

The printed fabric is dried and fixed in steam at 102–104° C. for 4–8 minutes. It is rinsed in cold and then hot water, washed at the boil (according to the method described in Application Example A) and dried. A navy print is obtained which has good general fastness properties.

Similarly, the dyestuffs of Examples 2 to 12 or mixtures of the exemplified dyestuffs are employed to print cotton in accordance with the method given in Application Example C. All prints obtained are navy and show good fastness properties.

Application Example D 2.5 parts of the dyestuff obtained in Example 1 are dissolved with stirring at 25° C. in a mixture of 20 parts diethyleneglycol and 77.5 parts water to obtain a printing ink suitable for ink jet printing.

The dyestuffs of Examples 2 to 12 or dyestuff mixtures of Examples 1 to 12 can also be used in a manner analogous to that described in Application Examples D.

What is claimed is:

1. A process for the preparation of compound according to formula (I)

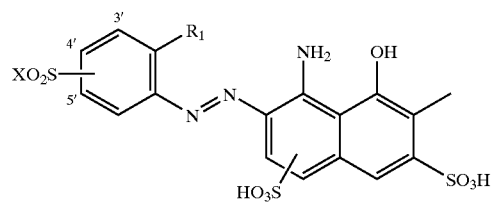
(I)

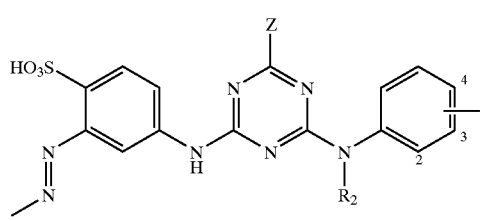

or a salt thereof, or a mixture of such a compound or of its salt, wherein

X is a group —CH=CH$_2$ or —CH$_2$CH$_2$Y, wherein Y is —OH or a group which can be split off under alkaline conditions, R$_1$ is H, —SO$_3$H, —COOH, —OCH$_3$, or —CH$_3$, R$_2$ is C$_{1-4}$alkyl or C$_{1-4}$hydroxyalkyl, Z is —Cl or —F, or a mixture thereof which is characterized by coupling a compound of formula (II)

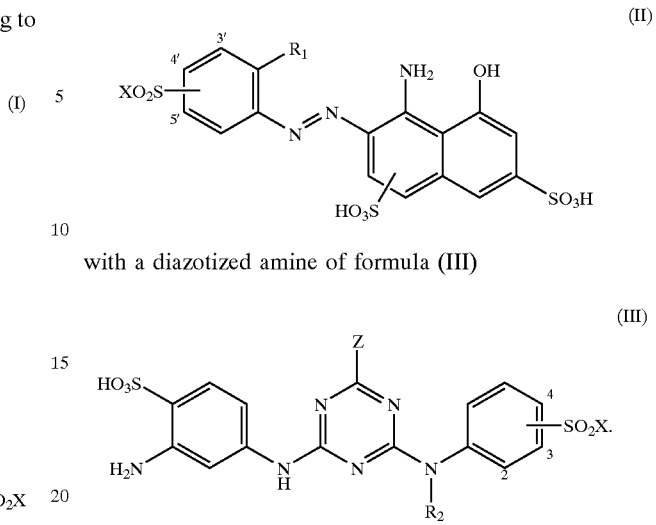

with a diazotized amine of formula (III)

2. A process for the preparation of an inkjet printing ink comprising using a dyestuff or a mixture of a dyestuff prepared according to the process of claim 1.

3. A process for dyeing or printing a hydroxy-group-containing or nitrogen-containing organic substrate wherein the dyeing or printing is performed with a compound prepared according to the process of claim 1, its salt or a mixture thereof.

4. A process for dyeing or printing a hydroxy-group-containing or nitrogen-group containing organic substrate dyed or printed using a compound prepared according to the process of claim 1, its salt or a mixture thereof.

5. A process for dyeing or printing a textile material consisting of or containing cotton using a compound prepared according to the process of claim 1, its salt or a mixture thereof.

* * * * *